United States Patent [19]

Lee et al.

[11] Patent Number: 5,861,461
[45] Date of Patent: Jan. 19, 1999

[54] BIODEGRADABLE PLASTIC COMPOSITION, METHOD FOR PREPARING THEREOF AND PRODUCT PREPARED THEREFROM

[75] Inventors: Byung Hyung Lee; Kwang Sik Jung; Young Wook Kim; Sang Gu Bang; Won Young Cho; Byoung Cheon Jo; Ki Nam Uhm, all of Taejon, Rep. of Korea

[73] Assignee: Yukong Limited, Seoul, Rep. of Korea

[21] Appl. No.: 757,691

[22] Filed: Dec. 3, 1996

[30] Foreign Application Priority Data

Dec. 6, 1995 [KR] Rep. of Korea .................. 95-48168

[51] Int. Cl.$^6$ ........................................... C08C 3/02
[52] U.S. Cl. ..................... 525/54.26; 524/47; 524/53; 524/52; 525/54.24
[58] Field of Search .................. 524/53, 47, 52; 575/54.26, 54.24

[56] References Cited

U.S. PATENT DOCUMENTS

| | | | |
|---|---|---|---|
| 5,254,607 | 10/1993 | McBride | 524/52 |
| 5,314,934 | 5/1994 | Tomka | 524/53 |
| 5,412,005 | 5/1995 | Bastiolo | 524/47 |
| 5,422,387 | 6/1995 | Toms | 524/52 |
| 5,462,982 | 10/1995 | Bastioli | 524/47 |

*Primary Examiner*—Fred Zitomer
*Attorney, Agent, or Firm*—Seidel, Coonda, Lavorgna & Monaco, PC

[57] ABSTRACT

A plastic composition superior in both biodegradability and physical properties, comprises a matrix resin which is a blend of polyethylene and a biodegradable aliphatic polyester, starch, a coupling agent, a radical initiator, a starch plasticizer, a starch destructurizing agent and an autooxidizing agent, wherein the starch chemically binds to the matrix resin.

13 Claims, 5 Drawing Sheets

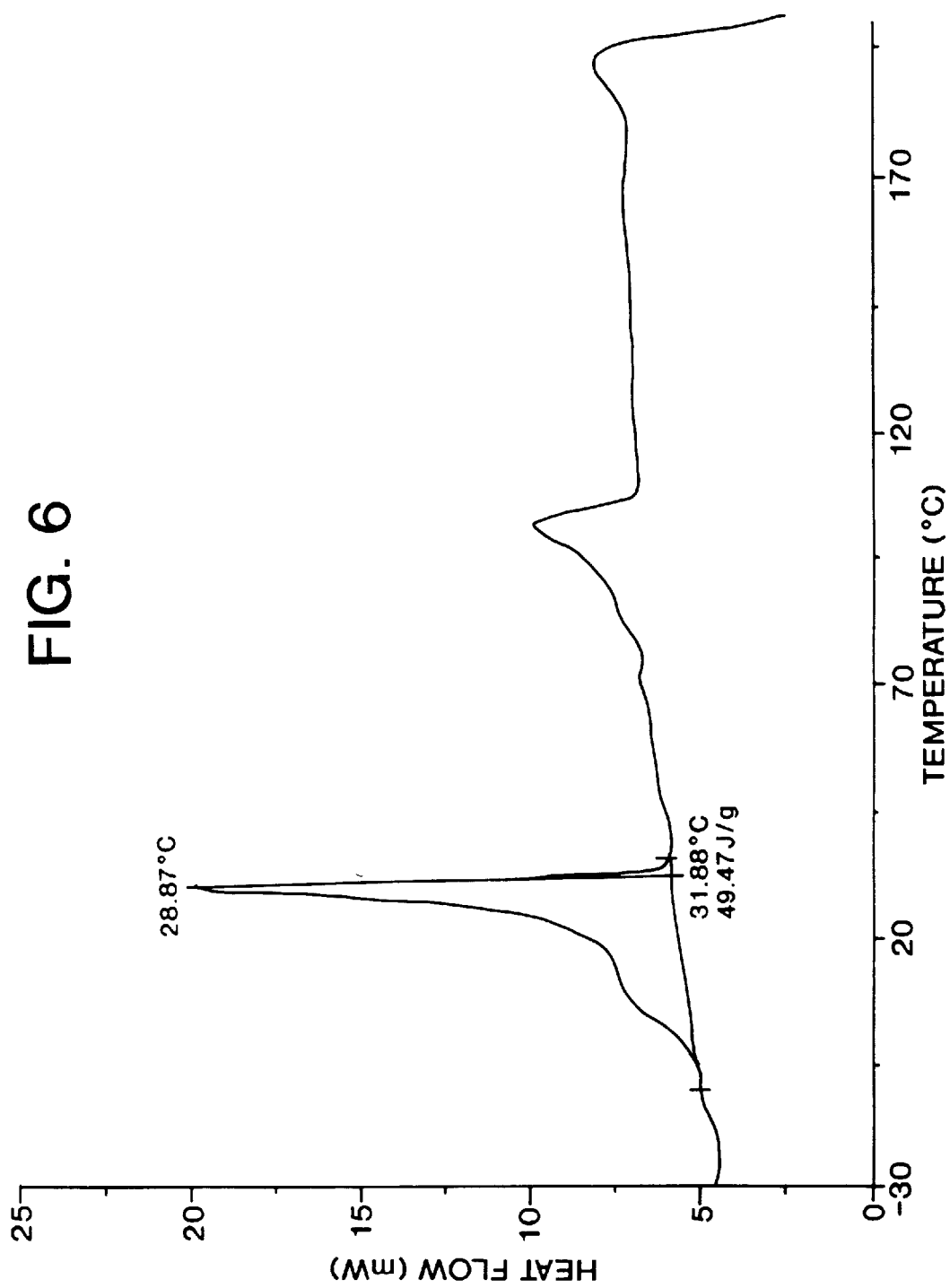

5,861,461

BIODEGRADABLE PLASTIC COMPOSITION, METHOD FOR PREPARING THEREOF AND PRODUCT PREPARED THEREFROM

BACKGROUND OF THE INVENTION

1. Field of the Invention

This invention relates to a biodegradable plastic composition superior in both biodegradability and physical properties, a method for preparing thereof and product prepared therefrom. More particularly, the present invention relates to a biodegradable plastic composition in which thermoplastic modified starch is chemically bonded to a matrix resin comprising polyethylene having a good processability and physical properties and biodegradable aliphatic polyesters. Also, the present invention pertains to a method for preparing the biodegradable plastic composition using a twin screw extruder, and pertains to a product prepared from the biodegradable plastic composition.

2. Description of the Prior Art

Synthetic plastics have been considered to overcome the limits and restraints of natural materials by virtue of their excellent physical properties and low price. It may fairly be said that various synthetic polymers including plastics have greatly contributed to the modern scientific civilization in many fields.

Plastic products, now pouring out from all over the world, however, cause such serious pollution as threatens the future of mankind. To solve this problem, various countermeasures have been taken. Conventionally, the methods of disposal of solid wastes including plastics include burial, incineration and recycling. However, these means cannot be a complete solution to the environmental pollution problem at all.

Recently, active research and development efforts have been directed to so-called degradable plastics which are environmentally self-degradable. There are three groups of degradable plastics: biodegradable plastics, photo-degradable plastics and bio- and photodegradable plastics of these, biodegradable plastics have been most widely used. This invention is also subject to utilization of biodegradable plastics.

Biodegradable plastics developed so far comprise as a degradable material, polymeric products of microorganisms such as poly-β-hydroxybutylate, polymers synthesized from the biochemicals produced by microorganisms, chemically synthesized aliphatic polyesters, or naturally synthesized polymers such as chitin, starch, etc.

The prior art concerning biodegradable plastics is exemplified by EP No. 304,401 in the name of Warner-Lambert Co. This patent discloses a processing technique that when starch containing a certain amount of moisture is kneaded with a plasticizer at a high temperature of 150° C. or higher in a closed system such as an extruder, the vapor pressure increases to break the hydrogen bond between starch molecules thus producing starch having thermoplasticity. This technique is mainly devoted to the production of molded parts. However, it is not suitable for film production. A high melting strength is required in processing film, and high elongation and tensile strength are necessary after production.

EP Nos. 400,531 and 400,532 to Novamont, introduced a technique by which, when a synthetic resin compatible with starch, such as ethylene-vinyl alcohol copolymer and ethylene-acrylic acid copolymer, is mixed with starch containing a certain amount of water in the presence of a plasticizer at a high temperature of 150°C. or higher in an extruder, intermolecular bonds of starch are destructurized and the starch chemically and physically binds to the resin to produce biodegradable films containing a high starch content. But the synthetic resins such as ethylene-vinyl alcohol copolymer and ethylene-ethylacrylic acid copolymer, display no biodegradability and are very expensive, so that it is quite difficult to substitute the films prepared from these synthetic resins for plastic films for general uses.

In addition, since aliphatic polyesters are expensive, they can be blended with low-priced polyethylene to reduce material cost. But the two polymers are not compatible with each other and thus the-mechanical properties decrease greatly by simple mixing. In the case of aliphatic polyesters having a low melting point of about 60° C., such as polycaprolactone, it is impossible for them to be processed into blown films, because the crystallization temperature is so low that bubbles of the films can not be sufficiently cooled under atmospheric air condition. So an additional cooling system like Chiller is necessary.

Korean Pat. Laid-Open Publication Nos. 94-11556 and 94-11558, both to the present inventors, disclose that starch is chemically bonded to the matrix resin by a coupling agent to overcome the deterioration of mechanical properties due to the addition of starch and to reduce the cost price by simplifying the procedure. However, there are still some problems such as low biodegradability and deterioration of mechanical properties due to the addition of starch.

SUMMARY OF THE INVENTION

As a result of further developing of the present inventors, a plastic composition superior in both biodegradability and mechanical properties has been achieved, which composition is characterized in that a thermoplastic modified starch is chemically bonded by use of a coupling agent to a matrix resin comprising low-priced polyethylene having good processability and physical properties and a biodegradable aliphatic polyester. As polyethylene is inexpensive and has a high crystallization temperature of about 100° C., reactive mixing of polyethylene and aliphatic polyesters can reduce the material cost, and can raise the crystallization temperature of the matrix resin. Additional equipment such as a chiller, is not required upon processing of the material into blown films The coupling agent acts also between polyethylene and aliphatic polyesters to overcome deterioration of the mechanical properties.

Therefore, it is an objective of the present invention to provide a biodegradable plastic composition in which starch is chemically bonded to a matrix resin.

It is another objective of the present invention to provide a method for preparing a biodegradable plastic composition.

It is a further objective of the present invention to provide a product prepared from the biodegradable plastic composition.

In accordance with an aspect of the present invention, there is provided a biodegradable plastic composition, comprising 100 parts by weight of a matrix resin in which polyethylene and a biodegradable aliphatic polyester are mixed in a weight ratio of 1:1 to 1:30, 10 to 150 parts by weight of starch, 0.01 to 40 parts by weight of a starch plasticizer, 0.01 to 10 parts by weight of a starch destructurizing agent, 0.01 to 10 parts by weight of a coupling agent, 0.01 to 1.0 parts by weight of a radical initiator, and 0.01 to 10 parts by weight of an autooxidizing agent.

In accordance with another aspect of the present invention, there is provided a method for preparing a biodegradable plastic composition, which comprises;

(a) feeding a matrix resin mixture comprising 100 parts by weight of a matrix resin in which polyethylene and a biodegradable aliphatic polyester are mixed in a weight ratio of 1:1 to 1:30, 0.01 to 10 parts by weight of a coupling agent and 0.01 to 1.0 parts by weight of a radical initiator through a main hopper into a twin screw extruder, and a starch mixture comprising 10 to 150 parts by weight of starch, 0.01 to 40 parts by weight of a starch plasticizer, 0.01 to 10 parts by weight of a starch is destructurizing agent and 0.01 to 10 parts by weight of an autooxidizing agent through a side hopper into said twin screw extruder;

(b) mixing the matrix resin mixture and the starch mixture; and (c) subjecting the mixture to reactive extrusion at a temperature of 150° to 220° C. and at a screw speed of 50 to 300 rpm.

In accordance with a further aspect of the present invention, there is provided a biodegradable plastic product prepared by pelletizing the biodegradable plastic composition of the present invention and molding or extruding the pellet.

BRIEF DESCRIPTION OF THE DRAWINGS

Other objectives and aspects of the invention will become apparent from the following description of embodiments with reference to the accompanying drawings in which:

FIG. 6 is a Differential Scanning Calorimetry graph of a composition according to Example 10 of the present invention.

DETAILED DESCRIPTION OF THE INVENTION

Figure 1:
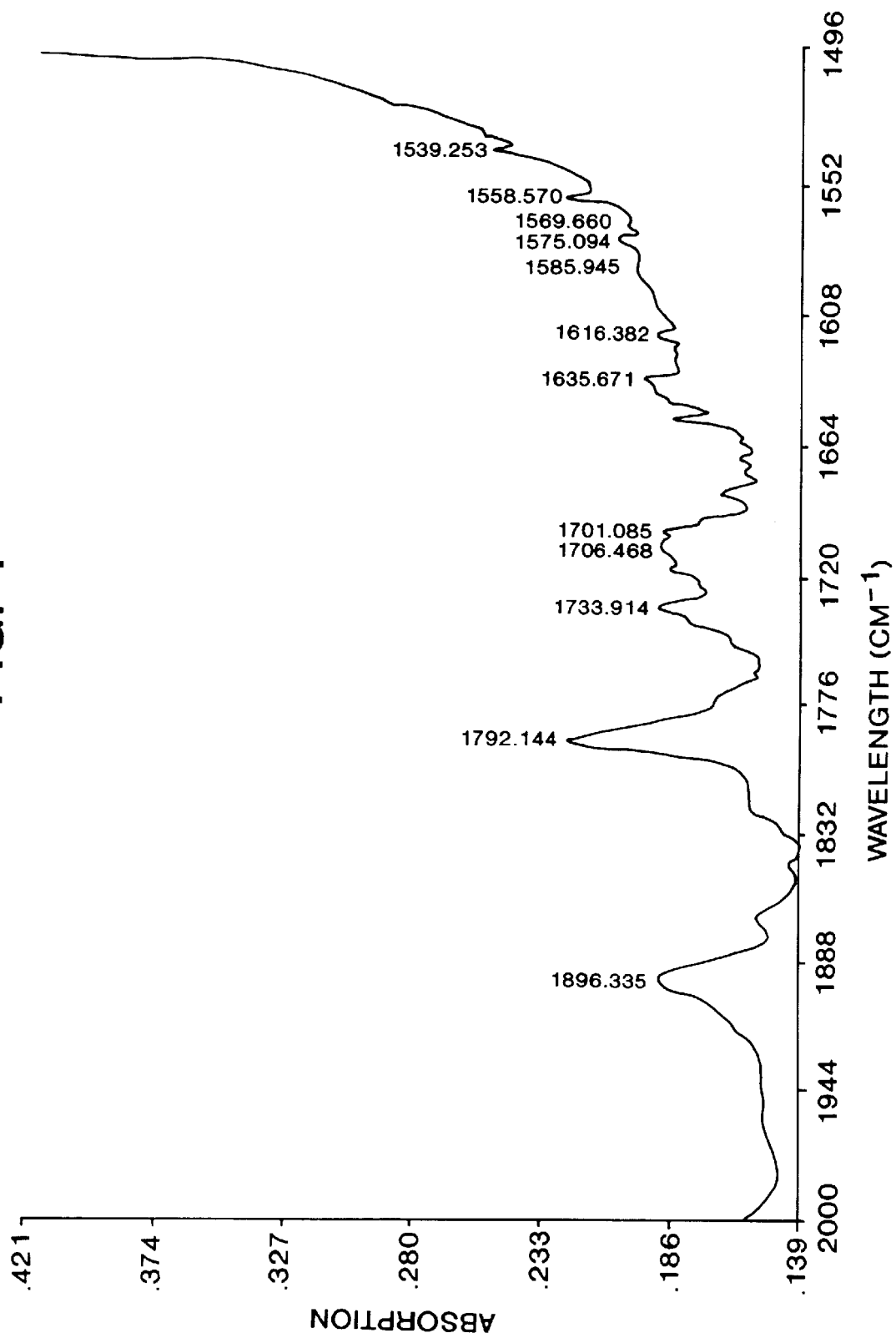
FIG. 1 is an infrared absorption spectrum of a conventional film according to Comparative Example 1.

The present invention pertains to a biodegradable plastic composition comprising 100 parts by weight of a matrix resin which is formed by mixing polyethylene and a biodegradable aliphatic polyester are mixed in a weight ratio of 1:1 to 1:30, 10 to 150 parts by weight of starch, 0.01 to 40 parts by weight of a starch plasticizer, 0.01 to 10 parts by weight of a starch destructurizing agent, 0.01 to 10 parts by weight of a coupling agent, 0.01 to 10 parts by weight of a radical initiator and 0.01 to 10 parts by weight of an autooxidizing agent, wherein the starch becomes so thermoplastic as to be modified to a degree that it chemically binds to the matrix resin via the coupling agent, and the biodegradability is improved by the addition of the aliphatic polyester.

In accordance with the present invention, the biodegradable plastic composition may further comprise 0.01 to 10 parts by weight of a comonomer and/or 0.01 to 10 parts by weight of a compatibilizing catalytic comonomer.

As the matrix resin, a mixture of low-priced polyethylene, superior in processability and physical properties, and a biodegradable aliphatic polyester is used, with the aim of enhancing biodegradability as well as processability and physical properties. The polyethylene is preferably selected from the group consisting of low density polyethylene, linear low density polyethylene and high density polyethylene. For the biodegradable aliphatic polyester, an aliphatic polyester including polycaprolactones, polylactic acids, and those aliphatic polyesters which are polycondensed from diol and diacid, or mixtures thereof, are preferably used.

The starch is selected from the group consisting of a general starch such as corn starch, potato starch and rice starch; acid-treated starch; esterified starch; cationic starch; and the mixtures thereof. The starch is preferably used at an amount of 10 to 150 parts by weight. For example, if the starch is used at an amount less than 10 parts by weight, the resulting composition is too slowly biodegraded. On the other hand, if the amount of the starch is larger than 150 parts by weight, the physical properties of the composition become degraded. It is most preferred that the starch is used at an amount of 60 to 120 parts by weight in order to give a composition superior in both biodegradability and physical properties.

For the coupling agent, maleic anhydride, methacrylic anhydride or maleimide may be used.

Preferred examples of the radical initiator include benzoyl peroxide, di-t-butyl peroxide, azobis-isobutyronitrile, t-butylhydroperoxide, dicumylperoxide, Lupersol 101 (trade name of a product from Pennwalt Company, 2,5-dimethyl-2,5-di(t-butylperoxy)hexane) and Perkadox-14 (trade name of a product from Akzo Company, 1,3-bis-(t-bytylperoxyisopropyl) benzene).

Ethylene glycol, propylene glycol, polyethylene glycol, sorbitol, glycerine (glycerol) or mixtures thereof can be used as the starch plasticizer.

Urea, p-toluene sulfonamide, or melamine is suitable for the starch destructurizing agent.

Serving to promote the decomposition of polyethylene, the autooxidizing agent is selected from the group consisting of oleic acid, stearic acid, manganese oleate, manganese stearate, iron (II) oleate, iron (II) stearate and mixtures thereof.

Preferred examples of the comonomer include acrylonitrile, styrene, ethylacrylate and the mixtures thereof.

Preferred examples of compatibilizing catalytic comonomer having both a catalyzing activity and a compatibility both include acrylic acid and/or methacrylic acid.

In accordance with the present invention, the composition is processed through reactive extrusion using a twin screw extruder in order to reduce the production cost by process simplification, and to minimize the degradation of physical properties following the addition of starch. In detail, a twin screw extruder equipped with two hoppers and two feeders is utilized in such a manner that a matrix resin mixture comprising 100 parts by weight of a matrix resin in which polyethylene and a biodegradable aliphatic polyester are mixed in a weight ratio of 1:1 to 1:30, and 0.01 to 10 parts by weight of a coupling agent, 0.01 to 1.0 parts by weight of a radical initiator and 0.01 to 10 parts by weight of an autooxidizing agent is fed through a main hopper, while a starch mixture comprising 1 to 150 parts by weight of starch, 0.01 to 40 parts by weight of a starch plasticizer and 0.01 to 10 parts by weight of a starch destructurizing agent is fed through a side hopper located at the middle of the extruder. The mixtures fed from the two hoppers are kneaded inside the twin screw extruder and subjected to reactive extrusion at a temperature of 150° to 220° C. and at a screw speed of 50 to 300 rpm. During the reactive extrusion, the coupling agent is grafted into the polyethylene chain to increase the compatibility between the polyethylene and the aliphatic polyester, and at the same time to esterify the same with the starch which has been broken intermolecularly. This gives a biodegradable plastic composition in which the starch chemically binds to the matrix resin.

Upon preparation of the composition, 0.01 to 10 parts by weight of a comonomer and/or 0.01 to 10 parts by weight of a compatibilizing catalytic comonomer may be added together with the coupling agent so as to increase the graft portion and its compatibility, in accordance with the present invention The biodegradable plastic composition may be extruded in a single screw extruder operated at a temperature of 150 to 220° C. and at a screw speed of 50 to 150 rpm, to give a general polyethylene blown film. Using the biodegradable plastic composition thus obtained, injected or molded articles can be produced via ordinary techniques.

A better understanding of the present invention may be obtained in light of following examples which are set forth to illustrate, but are not to be construed to limit, the present invention.

EXAMPLE I 2.5 kg of linear low density polyethylene (Melt Index=1 g/10 min, density=0.919 g/cm$^3$) and 2.5 kg of polycaprolactone (sold by Union Carbide Company under the trade name of "TONE P-787") were placed in a Henschel mixer and coated with a solution comprising 100 g of maleic anhydride, 10 g of oleic acid, 30 g of benzoyl peroxide, 20 g of manganese oleate, 50 g of acrylic acid, and 50 g of styrene in 100 mL of acetone. In another Henschel mixer, 500 g of corn starch with a moisture content of 10 % by weight, 50 g of glycerine, and 50 g of p-toluene sulfonamide were mixed. These mixtures were fed via two distinct feeders into an extruder maintained at a temperature of 170° C. and at a screw speed of 250 rpm, and subjected to reactive extrusion to give a biodegradable plastic composition pellet in which the starch was chemically bonded to the matrix resin. This pellet was prepared into a film whose mechanical properties and biodegradability are given in Table 1 below.

EXAMPLES II THROUGH VI

Figure 3:
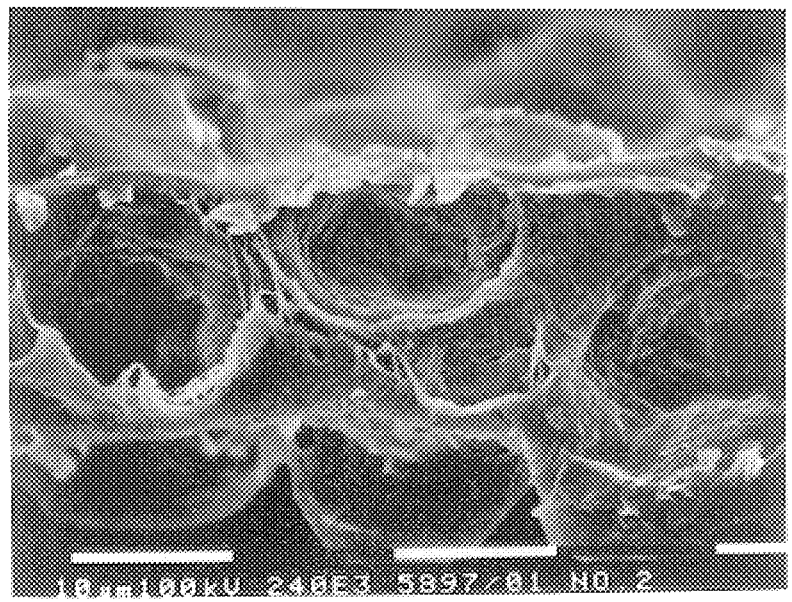
FIG. 3 is a scanning electron microphotograph showing the cross section of the film of Comparative Example 5, magnified by 2400 times.

Biodegradable composition pellets were obtained in a similar manner to that of Example I, except that the starch content employed was as indicated in Table 1 below. Films were from the pellets and tested for physical properties and biodegradability. The test results are given as shown in Table 1 below. The cross section of the film obtained according to Example IV was observed via a scanning electron microscope. FIG. 3 is a copy of the scanning electron microphotograph magnified by 2,000 times.

Comparative Example I

A composition was prepared in a similar manner to Example I, except that polycaprolactone and starch were not added. The composition thus obtained was blown into a film. The biodegradability of the film is given in Table 1 below.

The infrared absorption spectrum of the film thus obtained is shown as FIG. 1.

Comparative Example II

A composition was prepared in a similar manner to Example I, except that polycaprolactone was not used in order to confirm the ester bond formed between matrix resin and starch. The composition thus obtained was blown into a film whose biodegradability is given as shown in Table 1 below. The infrared absorption spectrum of the film thus obtained is shown as FIG. 2.

Comparative Example III

A composition was prepared in a similar manner to Example I, except that starch and maleic anhydride, the coupling agent, were not used. The composition thus obtained was blown into a film whose physical properties and biodegradability are given as shown in Table 1 below.

Comparative Example IV

A composition was prepared in a similar manner to Example I, except that starch was not used. The composition thus obtained was blown into a film whose physical properties and biodegradability are given as shown in Table 1 below.

Comparative Example V

A composition was prepared in a similar manner to Example IV, except that the starch was not plasticized. The composition thus obtained was blown into a film whose physical properties and biodegradability are given as shown in Table 1 below. The cross section of the film obtained was observed by a scanning electron microphotograph magnified by 2400 times. FIG. 3 is a copy thereof.

Comparative Example VI

A composition was prepared in a similar manner to Example IV, except that maleic anhydride, the coupling agent, was not used. The composition thus obtained was blown into a film whose physical properties and biodegradability are given as shown in Table 1 below.

TABLE 1

| Example No. | Starch Content (parts by wt) | Tensile Strength at Break (kg/cm$^2$) | Elongation at Break (%) | Biodegradability |
|---|---|---|---|---|
| C.E.* I | 0 | — | — | 0 |
| C.E. II | 10 | — | — | 1 |
| C.E. III | 0 | 200 | 400 | 2 |
| C.E. IV | 0 | 350 | 600 | 2 |
| C.E. V | 90 | 150 | 300 | 4 |
| C.E. VI | 90 | 170 | 370 | 4 |
| I | 10 | 340 | 600 | 2 |
| II | 30 | 330 | 580 | 3 |
| III | 60 | 310 | 550 | 4 |
| IV | 90 | 280 | 530 | 4 |
| V | 120 | 220 | 450 | 4 |
| VI | 150 | 120 | 300 | 4 |

*C.E. means Comparative Example.

As taught in ASTM G21–70, the films were tested for biodegradability. That is, following culture of fungi on the films for at least 21 days, the degrees to which the fungi covered the films were designated as follows:

0: 0%

1: 10%

2: 10 to 30%

3: 30 to 60%

4: 60 to 100%

For measuring the tensile strength and the elongation of the films, a universal testing machine (UTM) was employed.

EXAMPLES VII THROUGH XIII

Biodegradable films were prepared in a similar manner to that of Example IV, except that polycaprolactone (sold by Union Carbide Company under the trade name of "TONE P-787") was mixed with linear low density polyethylene at the amounts as indicated in Table 2 below. The film physical properties and biodegradability are given as shown in Table 2 below. The Differential Scanning Calorimetry data for a composition according to Example X is graphed in FIG. 6.

TABLE 2

| Example No. | Weight Ratio** | Tensile Strength at Break (kg/cm$^2$) | Elongation at Break (%) | Biodegradability |
|---|---|---|---|---|
| IV | 1:1 | 280 | 530 | 4 |
| VII | 1:3 | 310 | 550 | 4 |
| VIII | 1:5 | 320 | 560 | 4 |
| IX | 1:7 | 330 | 580 | 4 |
| X | 1:9 | 330 | 590 | 4 |
| XI | 1:15 | 340 | 600 | 4 |
| XII | 1:20 | 340 | 620 | 4 |
| XIII | 1:30 | 350 | 620 | 4 |

**weight ratio of polyethylene to polycaprolactone

EXAMPLES XIV THROUGH XIX

Biodegradable films were prepared in a similar manner to that of Example I, except the starch content was as indicated in Table 3 below; methacrylic anhydride was used as a coupling agent instead of maleic anhydride; and methacrylic acid was used as a compatibilizing catalytic comonomer instead of acrylic acid. The physical properties and the biodegradability of the films are given as shown in Table 3 below.

TABLE 3

| Example No. | Starch Content (parts by wt) | Tensile Strength at Break (kg/cm$^2$) | Elongation at Break (%) | Biodegradability |
|---|---|---|---|---|
| I | 10 | 340 | 600 | 2 |
| XIV | 10 | 280 | 550 | 2 |
| XV | 30 | 270 | 530 | 3 |
| XVI | 60 | 250 | 500 | 4 |
| XVII | 90 | 200 | 410 | 4 |
| XVIII | 120 | 180 | 330 | 4 |
| XIX | 150 | 70 | 250 | 4 |

EXAMPLES XX THROUGH XXIII

Biodegradable films were prepared in a similar manner to that of Example XVII, except that polycaprolactone (sold by Union Carbide company under the trade name of "TONE P-7871") was mixed with linear low density polyethylene at amounts as indicated in Table 4 below. The physical properties and biodegradability of the films are given as shown in Table 4 below.

TABLE 4

| Example No. | Weight Ratio** | Tensile Strength at Break (kg/cm$^2$) | Elongation at Break (%) | Biodegradability |
|---|---|---|---|---|
| XVII | 1:1 | 200 | 410 | 4 |
| XX | 1:3 | 210 | 420 | 4 |
| XXI | 1:5 | 210 | 450 | 4 |
| XXII | 1:7 | 220 | 460 | 4 |
| XXIII | 1:9 | 230 | 480 | 4 |

**weight ratio of polyethylene to polycaprolactone

As is obvious from Examples 1 to 6 and Comparative Examples 1 to 6, the films comprising starch and/or aliphatic polyesters are biodegradable, whereas the films without starch and aliphatic polyesters (such as the comparative Example 1 film) is not biologically degraded at all. Comparing Comparative Example 3 without the coupling agent and starch with Comparative Example 4 without starch, Comparative Example 3 comprising a matrix resin in which polyethylene and aliphatic polyesters are mixed is less compatible than Comparative Example 4 and thus the mechanical properties of Comparative Example 3 are inferior. The data of Examples III and XVI show that when starch is added at an amount greater than 60 parts by weight, the films are much enhanced in biodegradability. The presence of starch at an amount of 120 parts by weight or greater shows good biodegradability but deleteriously affects tensile strength and elongation, as exhibited in Examples V and XVIII. Thus, a plastic composition comprising an appropriate starch content can be selected according to the required physical properties and biodegradability of the plastic products. Most, if not all, biodegradable films of the present invention are excellent in both physical properties and biodegradability when they comprise starch at an amount ranging from 60 to 120 parts by weight.

Figure 2:
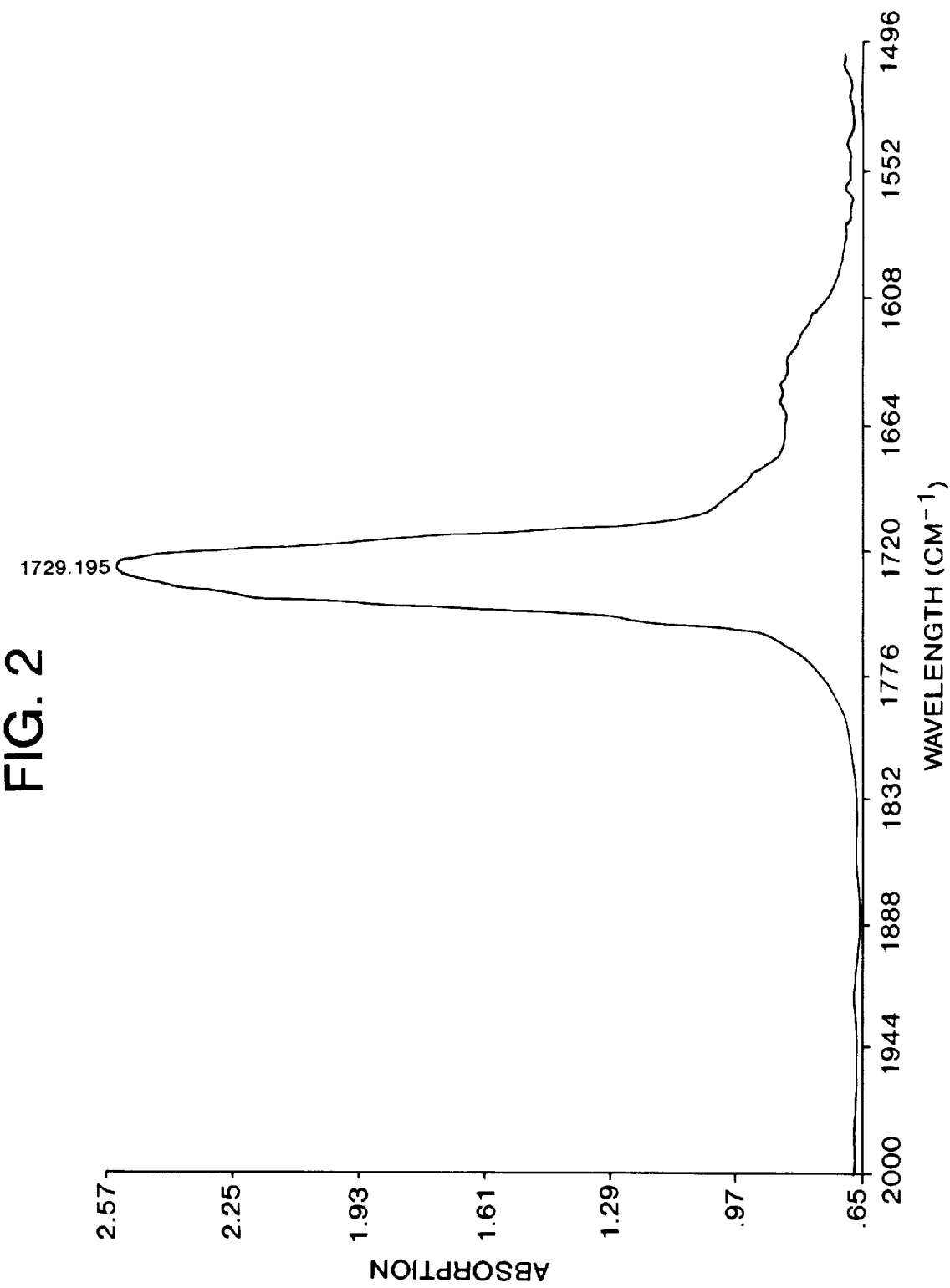
FIG. 2 is an infrared absorption spectrum of a film according to Comparative Example 2.

Separately, the chemical bond formation between the starch and the matrix resin was confirmed by infrared absorption spectrum. FIGS. 1 and 2 show the infrared spectra analysis. As read at 1800 to 1760 cm$^{-1}$ on the infrared spectrum of FIG. 1, when grafting the coupling agent with the polyethylene resin without addition of starch and polycaprolactones (Comparative Example I), an absorption peak occurs for the acid anhydride of the coupling agent. In contrast, when the polyethylene resin was subjected to reactive extrusion together with starch (Comparative Example II), an absorption peak was read at 1760 to 1680 cm$^{-1}$ but not at 1800 to 1760 cm$^{-1}$, providing the information that an ester bond is newly generated through reaction of the acid anhydride of the coupling agent with the hydroxyl group of the starch, as shown in FIG. 2 The reason why only polyethylene is used as a matrix resin in Comparative Examples 1 and 2 is to prevent the overlapping of the absorption peak of the ester bond formed by chemical bonding between the matrix resin and the starch with the absorption peak of aliphatic polyesters.

Figure 4:
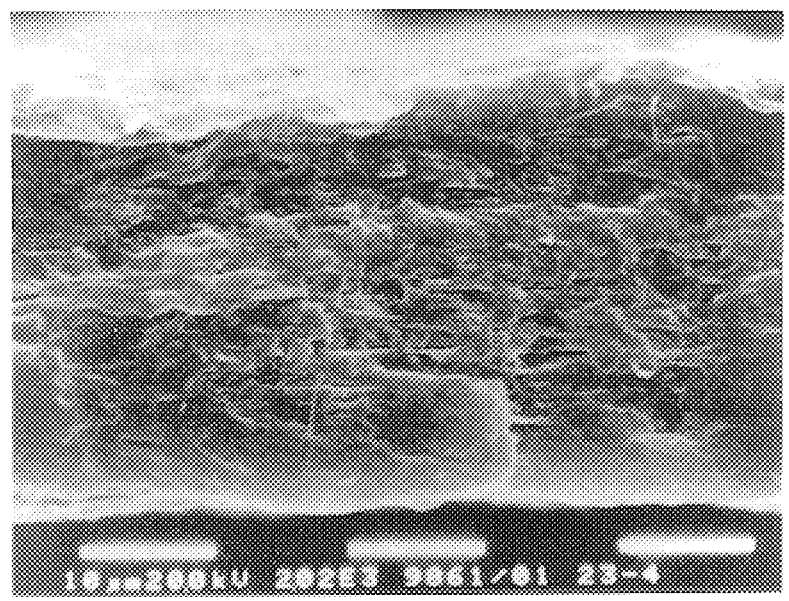
FIG. 4 is a scanning electron microphotograph showing the cross section of the biodegradable film of Example 4 of the present invention, magnified by 2000 times.

The starch particles were reduced in size from 7 to 20 $\mu$m (FIG. 3) into 1 $\mu$m or less (FIG. 4) as a result of breaking the intermolecular bonds of starch, when observing the cross section of the films according to Example IV and Comparative Example V by a scanning electron microscope.

Figure 5:
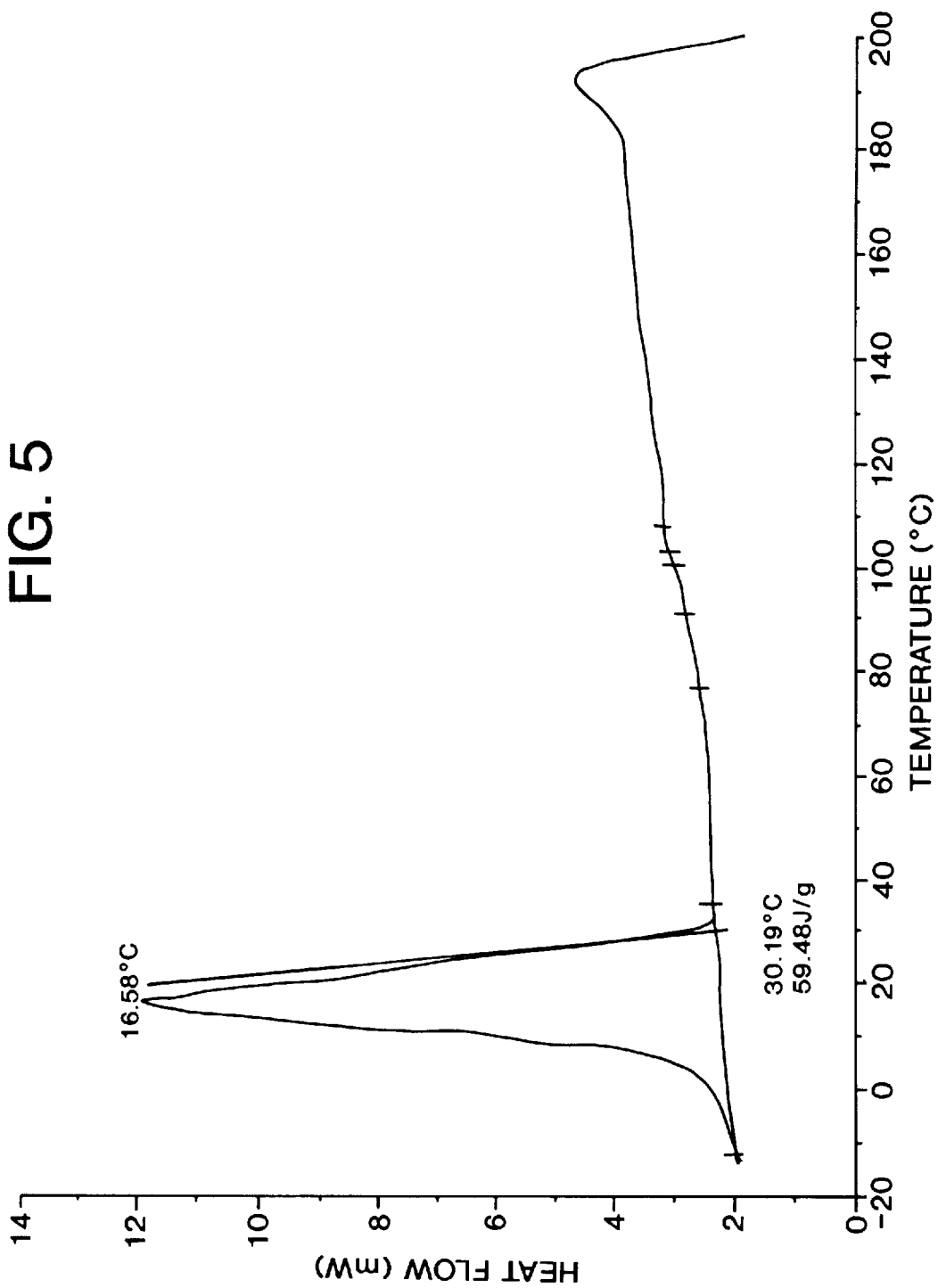
FIG. 5 is a Differential Scanning Calorimetry (DSC) graph of polycaprolactones.

When the crystalization temperature of polycaprolactones (FIG. 5) and Example X (FIG. 6) were observed using Deferential Scanning Calorimetry, the crystallization temperature of the polycaprolactones increases from 17° C. (FIG. 5) to 29° C. (FIG. 6) by mixing polyethylene and thermoplastic starch with polycaprolactones using the coupling agent Further, Differential Scanning Calorimetry reveals that a crystallization newly occurs at about 100° C.

and this means that a film processability is improved by promoting of cooling upon a film processing. It is apparent from the above Table 2 that good physical properties and biodegradability, as well as a good film processability are obtained.

The present invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, the invention may be practiced otherwise than as specifically described.

What is claimed is:

1. A biodegradable plastic composition comprising 100 parts by weight of a matrix resin in which polyethylene and a biodegradable aliphatic polyester are mixed in a weight ratio of 1:1 to 1:30, wherein said biodegradable aliphatic polyester is selected from the group consisting polycaprolactone, polylactic acid, aliphatic polyester polycondensed from diol and diacid and mixtures thereof: 10 to 150 parts by weight of starch; 0.01 to 40 parts by weight of a starch plasticizer; 0.01 to 10 parts by weight of a starch destructurizing agent; 0.01 to 10 parts by weight of a coupling agent; 0.01 to 1.0 parts by weight of a radical initiator; and 0.01 to 10 parts by weight of an autooxidizing agent; wherein the starch chemically binds to the matrix resin.

2. The biodegradable plastic composition in accordance with claim 1, further comprising at least one of a comonomer at an amount of 0.01 to 10 parts by weight and a compatibilizing catalytic comonomer at an amount of 0.01 to 10 parts by weight.

3. The biodegradable plastic composition in accordance with claim 2, wherein said comonomer is selected from the group consisting of acrylonitrile, styrene, ethylacrylate and mixtures thereof.

4. The biodegradable plastic composition in accordance with claim 2, wherein said compatibilizing catalytic comonomer is selected from the group consisting of acrylic acid, methacrylic acid and mixtures thereof.

5. The biodegradable plastic composition in accordance with claim 1, wherein said polyethylene is low density polyethylene, linear low density polyethylene, or high density polyethylene.

6. The biodegradable plastic composition in accordance with claim 1, wherein said starch is present at an amount of 60 to 120 parts by weight.

7. The biodegradable plastic composition in accordance with claim 1, wherein said starch is selected from the group consisting of (i) general starch selected from the group consisting of corn starch, potato starch, rice starch, and mixtures thereof, (ii) acid-treated starch, (iii) esterified starch, (iv) cationic starch, and mixtures thereof.

8. The biodegradable plastic composition in accordance with claim 1, wherein said starch plasticizer is selected from the group consisting of ethylene glycol, propylene glycol, polyethylene glycol, sorbitol, glycerol and the mixtures thereof.

9. The biodegradable plastic composition in accordance with claim 1, wherein said starch destructurizing agent is selected from the group consisting of urea, p-toluene sulfonamide, melamine and the mixtures thereof.

10. The biodegradable plastic composition in accordance with claim 1, wherein said coupling agent is selected from the group consisting of maleic anhydride, methacrylic anhydride and maleimide.

11. The biodegradable plastic composition in accordance with claim 1, wherein said radical initiator is selected from the group consisting of benzoyl peroxide, di-t-butyl peroxide, azobis-isobutyronitrile, t-butylhydroperoxide, dicumylperoxide, 1,3-bis(t-butylperoxyisopropyl)benzene, and 2,5-dimethyl-2,5-di(t-butylperoxy)hexane.

12. The biodegradable plastic composition in accordance with claim 1, wherein said autooxidizing agent is selected from the group consisting of oleic acid, stearic acid, manganese oleate, manganese stearate, iron (II) oleate, iron (II) stearate and the mixtures thereof.

13. A biodegradable plastic product prepared from the biodegradable composition of claim 1.

* * * * *